Patented July 8, 1924.

1,501,009

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

TENNIS BALL AND METHOD OF MANUFACTURING THE SAME.

No Drawing. Application filed December 23, 1922. Serial No. 608,752.

REISSUED

*To all whom it may concern:*

Be it known that I, THOMAS W. MILLER, a citizen of the United States, residing at Ashland, county of Ashland, State of Ohio, have invented certain new and useful Improvements in Tennis Balls and Methods of Manufacturing the Same, of which the following is a specification.

My invention relates to tennis balls and the method of manufacturing the same, and has for its object to produce a ball of this character formed of sponge rubber, and provided with a coating of wool floc, said coating being seamless, and being applied to the ball in such manner as to be practically incapable of removal therefrom except through excessive wear.

In carrying out my invention, I first form the ball by the usual sponge rubber process in a spherical mold of the desired size, the quantity of rubber used being sufficient to produce a ball of the weight of the ordinary tennis ball. Said ball so formed then is dipped into a rubber cement into which has been incorporated a percentage of floc, such as wool or cotton, and before this coating has thoroughly dried the ball is placed in a receptacle, preferably a revolving tumbler containing loose wool floc, and through the rotation of said tumbler a percentage of said floc will come in contact with and attach itself to the surface of the ball. The ball then is removed and replaced in the vulcanizing mold in which it was originally formed, or in a similar mold of the same size, and heated until the rubber cement into which the floc was incorporated and to which the additional floc adheres becomes vulcanized. The slight compression in the mold due to the slight additional thickness given to the ball by the application of the cement and floc will serve to compact the floc thereon, thus presenting a smooth surface in the finished ball.

It has been found that by dipping the ball in rubber cement containing a percentage of floc, and then adding additional floc by the tumbling process, the latter floc unites under pressure with the floc in the cement, thus providing a better looking and more durable cover than can be obtained by adding the floc by the tumbling process alone.

Having thus fully described my invention, what I claim as new and desire to secure by Letters Patent, is:—

1. A tennis ball, comprising a body formed of sponge rubber, and a coating of loose wool floc applied and compacted thereon by vulcanization.

2. The method of manufacturing sponge rubber tennis balls and the like, which consists first in forming by vulcanization a sponge rubber ball of the desired size and weight, then dipping the same in a rubber cement containing a percentage of floc, then applying to the surface of said ball before it dries a coating of loose wool floc, and finally vulcanizing said cement coating under slight compression.

3. The method of vulcanizing sponge rubber tennis balls and the like, which consists first in forming by vulcanization a sponge rubber ball of the desired size and weight, then dipping the same in a rubber cement containing a percentage of floc, then before the cement dries tumbling said ball in loose wool floc, and finally vulcanizing said cement coating under slight compression.

In testimony whereof I hereunto affix my signature.

THOMAS W. MILLER.